United States Patent
Yoshida et al.

(10) Patent No.: US 9,378,863 B2
(45) Date of Patent: Jun. 28, 2016

(54) INSULATING VARNISH AND INSULATED ELECTRICAL WIRE USING SAME

(71) Applicants: SUMITOMO ELECTRIC INDUSTRIES, LTD., Osaka-shi, Osaka (JP); SUMITOMO ELECTRIC WINTEC, INC., Koka-shi, Shiga (JP)

(72) Inventors: Kengo Yoshida, Koka (JP); Masaaki Yamauchi, Koka (JP); Masataka Shiwa, Koka (JP); Yuji Hatanaka, Koka (JP); Junichi Imai, Koka (JP); Jun Sugawara, Osaka (JP); Toru Shimizu, Osaka (JP); Hideaki Saito, Osaka (JP); Yuudai Furuya, Osaka (JP)

(73) Assignees: SUMITOMO ELECTRIC INDUSTRIES, LTD., Osaka (JP); SUMITOMO ELECTRIC WINTEC, INC., Shiga (JP)

( * ) Notice: Subject to any disclaimer, the term of this patent is extended or adjusted under 35 U.S.C. 154(b) by 37 days.

(21) Appl. No.: 14/003,331

(22) PCT Filed: Nov. 5, 2012

(86) PCT No.: PCT/JP2012/078606
§ 371 (c)(1),
(2) Date: Sep. 5, 2013

(87) PCT Pub. No.: WO2013/073397
PCT Pub. Date: May 23, 2013

(65) Prior Publication Data
US 2014/0054062 A1    Feb. 27, 2014

(30) Foreign Application Priority Data

Nov. 16, 2011  (JP) .................................. 2011-250532

(51) Int. Cl.
*H01B 3/30*    (2006.01)
*H01B 7/08*    (2006.01)
(Continued)

(52) U.S. Cl.
CPC .............. *H01B 3/306* (2013.01); *C08G 73/105* (2013.01); *C08G 73/1042* (2013.01);
(Continued)

(58) Field of Classification Search
CPC ......................................................... H01B 3/30
USPC ........................ 174/110 R; 428/411.1, 473.5
See application file for complete search history.

(56) References Cited

U.S. PATENT DOCUMENTS 3,179,635 A * 4/1965 Frost et al. .................... 528/183
3,391,246 A * 7/1968 Freeman et al. ........ 174/117 FF
(Continued)

FOREIGN PATENT DOCUMENTS

CN         101484532 A      7/2009
CN         101650984 A      2/2010
(Continued)

OTHER PUBLICATIONS

Office Action in the corresponding Chinese Patent Application No. 201280013485.7 dated Jan. 27, 2016.
(Continued)

*Primary Examiner* — Jeremy C Norris
*Assistant Examiner* — Muhammed Azam
(74) *Attorney, Agent, or Firm* — Global IP Counselors, LLP

(57) ABSTRACT

An insulating varnish forms an insulating coating film having a shape that corresponds to the shape of an opening of a die, having a uniform thickness. The insulating varnish is applied onto a surface of a conductor, subsequently passes through a die to remove the excess applied insulating varnish, and is then dried or baked to form an insulating coating film on the surface of the conductor. The insulating varnish has a viscosity of 10 Pa·s or more measured by a B-type viscometer at 30° C. The insulating varnish preferably contains no filler, and is preferably a polyimide precursor solution. Since the insulating varnish has a high viscosity, baking and solidification can be performed while maintaining a shape formed when the insulating varnish passes through a die.

9 Claims, 2 Drawing Sheets

(51) Int. Cl.
  *H01B 13/06* (2006.01)
  *C09D 179/08* (2006.01)
  *C09D 201/00* (2006.01)
  *C08G 73/10* (2006.01)

(52) U.S. Cl.
  CPC ....... *C08G 73/1067* (2013.01); *C08G 73/1071* (2013.01); *C09D 179/08* (2013.01); *C09D 201/00* (2013.01); *H01B 3/30* (2013.01); *H01B 7/08* (2013.01); *H01B 13/065* (2013.01); *Y10T 428/2969* (2015.01)

(56) References Cited

U.S. PATENT DOCUMENTS

| | | | | |
|---|---|---|---|---|
| 3,616,177 | A | * | 10/1971 | Gumerman ............. C08J 7/047 174/110 FC |
| 3,625,911 | A | * | 12/1971 | Redman ................ C03C 25/328 524/726 |
| 3,857,820 | A | * | 12/1974 | Kojima ................ C08G 18/343 156/331.7 |
| 4,240,914 | A | * | 12/1980 | Iwama .................. B01D 71/64 210/500.23 |
| 4,428,977 | A | * | 1/1984 | Peterson ........................ 427/120 |
| 4,590,098 | A | * | 5/1986 | Kazuse et al. ................. 427/244 |
| 4,634,760 | A | * | 1/1987 | Takekoshi et al. ............. 528/353 |
| 4,677,818 | A | * | 7/1987 | Honda et al. .................... 57/224 |
| 5,128,175 | A | * | 7/1992 | Yamanishi ........... H01B 7/0233 264/415 |
| 2002/0062983 | A1 | * | 5/2002 | Mesaki ..................... 174/120 R |
| 2003/0129379 | A1 | * | 7/2003 | Yao ........................ B29C 41/12 428/308.4 |
| 2007/0009727 | A1 | * | 1/2007 | Sawada ..................... C08J 9/24 428/304.4 |
| 2010/0059248 | A1 | * | 3/2010 | Honda et al. ............. 174/110 SR |
| 2010/0062188 | A1 | * | 3/2010 | Miyamoto et al. ............. 428/1.6 |
| 2011/0127067 | A1 | * | 6/2011 | Honda ................ C09D 179/08 174/120 SR |
| 2011/0240331 | A1 | * | 10/2011 | Kikuchi et al. ........... 174/110 R |
| 2012/0241191 | A1 | * | 9/2012 | Funayama et al. ........ 174/119 C |
| 2013/0084515 | A1 | * | 4/2013 | Kang ..................... B01D 61/38 429/492 |

FOREIGN PATENT DOCUMENTS

| | | | |
|---|---|---|---|
| GB | 903271 | * | 8/1962 |
| JP | S55-015641 | A | 2/1980 |
| JP | S55-19763 | A | 2/1980 |
| JP | 11-309729 | A | 11/1999 |
| JP | 2008-123759 | A | 5/2008 |
| JP | 2010-135135 | A | 6/2010 |
| JP | 2010-277988 | A | 12/2010 |
| JP | 2012-048919 | A | 3/2012 |
| JP | 2012-197367 | A | 10/2012 |

OTHER PUBLICATIONS

Office Action in the corresponding Chinese Patent Application No. 201280013485.7 dated Jun. 3, 2015.

* cited by examiner

INSULATING VARNISH AND INSULATED ELECTRICAL WIRE USING SAME

CROSS-REFERENCE TO RELATED APPLICATIONS

This U.S. National stage application claims priority under 35 U.S.C. §119(a) to Japanese Patent Application No. 2011-250532, filed in Japan on Nov. 16, 2011 the entire contents of which are hereby incorporated herein by reference.

TECHNICAL FIELD

The present invention relates to an insulating varnish used in an insulating coating of an electrical wire, in particular, to an insulating varnish having a good coatability on a flat electrical wire.

BACKGROUND ART

In general, an insulated electrical wire having an insulating coating film on a surface of a conductor is produced as follows. Specifically, first, an insulating varnish is applied onto a surface of a conductor (core wire). Subsequently, by using a coating die, the amount of insulating varnish applied onto the surface of the conductor (core wire) is adjusted and the surface of the applied insulating varnish is smoothed. The applied varnish is then baked through a baking furnace to form an insulating coating film on the surface of the conductor. This series of operations (namely, the application of the insulating varnish, the adjustment of the amount of coating, and the baking) is repeatedly performed a plurality of times until the thickness of the insulating coating film reaches a predetermined value.

The coating die has an opening, and the core wire coated with the insulating varnish passes through this opening to remove the excess insulating varnish, thereby adjusting the amount of coating. In the case where an insulating coating film of an insulated electrical wire has an uneven thickness, the electrical insulating property of the insulated electrical wire is determined by a portion where the thickness of the insulating coating film is small. Therefore, the insulating property may be determined to be insufficient. Accordingly, it is important to make the film thickness uniform. For example, as described in Japanese Unexamined Patent Application Publication No. 2008-123759 (PTL 1), a coating die having an opening whose shape in plan view is substantially similar to the cross-sectional shape of a conductor is usually used.

Hitherto, a conductor (round wire) whose cross section has a substantially circular shape has been used as the conductor (core wire) of an insulated electrical wire. However, recently, a conductor (flat conductor) wire whose cross section has a substantially rectangular shape (whose cross section has a substantially flat shape) has been widely used from the standpoint of a high space factor and the possibility of the realization of reduction in the size of various devices. In the case where an insulating coating film of such a flat electrical wire has an uneven thickness, in the state of winding, the electrical wires do not directly contact with each other and unnecessary spaces may be formed, which may result in the decrease in the space factor. In the flat electrical wire, the uniformity of the coating film is important for the above reason. However, it is difficult to make the thickness of the coating film uniform, as compared with the case of a round wire.

Specifically, as illustrated in FIG. 1, in the case of the preparation of a flat electrical wire in which a core wire 1 has a coating film 2 having a uniform thickness, as illustrated in FIG. 2, a die having an opening 3 having a shape similar to the shape of the core wire 1 is used. However, in a flat electrical wire having both a planar portion 1a and a straight down portion 1b orthogonal to the planar portion 1a, while the flat electrical wire passes through the die and is then cured, an insulating varnish easily flows in corners of a flat conductor due to the surface tension of the insulating varnish. Consequently, an insulating coating film whose cross section has a so-called dog bone shape, in which corners 2'a of a coating film 2' project, is formed, as illustrated in FIG. 3.

CITATION LIST

Patent Literature

PTL 1: Japanese Unexamined Patent Application Publication No. 2008-123759
PTL 2: Japanese Unexamined Patent Application Publication No. 2012-048919

DISCLOSURE OF INVENTION

Technical Problem

In order to make the thickness of an insulating coating film uniform, for example, PTL 2 above has proposed the use of a coating die having a shape different from the shape of a conductor. Specifically, the coating die is formed such that, on a surface of an opening of the coating die through which a conductor passes, the surface facing a surface of the conductor, a portion facing the center of a linear portion of the conductor is more concave than a portion facing an edge of the linear portion of the conductor.

However, even when the shape of the die is appropriately designed, in the case where the type of varnish is changed, a dog-bone-shaped coating film may still be formed. Thus, other solutions have been desired from the standpoint of versatility.

The present invention has been made in view of the above circumstances. An object of the present invention is to provide an insulating varnish that easily forms an insulating coating film having a shape that corresponds to the shape of an opening of a die, namely, an insulating coating having a uniform thickness without providing a die for solving the above problem.

Solution to Problem

An insulating varnish of the present invention is an insulating varnish that is applied onto a surface of a conductor, subsequently passes through a die to remove the excess applied insulating varnish, and is then dried or baked to form an insulating coating film on the surface of the conductor, the insulating varnish having a viscosity of 10 Pa·s or more at 30° C. The term "viscosity" used herein refers to a viscosity measured with a B-type viscometer.

The insulating varnish of the present invention preferably contains no filler. The insulating varnish of the present invention is preferably a polyimide precursor solution.

An insulated electrical wire of the present invention includes an insulating coating film obtained by applying the insulating varnish of the present invention onto a conductor, and subsequently baking the insulating varnish. In particular, the insulated electrical wire of the present invention is suitable for the case where the conductor is a flat conductor having a rectangular cross section. According to an insulated electrical wire in a preferred embodiment of the present invention, in the case of a flat conductor having a rectangular cross section, for 30 cross sections of the insulating coating film at intervals of 50 cm in the longitudinal direction of the electrical wire, with respect to an average of film thicknesses at 16 points on each of the cross sections (average film thickness of 16 points×30 sections=480 points), a variation ratio represented by a formula below is 20% or less. In the formula below, σ represents the standard deviation.

Variation ratio (%)=(4σ/average film thickness)×100

Advantageous Effects of Invention

The insulating varnish of the present invention has a viscosity significantly higher than those of existing insulating varnishes and thus baking and solidification can be performed while maintaining a shape formed when the insulating varnish passes through a die. Accordingly, the variation in the thickness of an insulating coating film can be reduced by using the insulating varnish of the present invention. Therefore, even when the insulating varnish of the present invention is applied to a flat conductor, which is susceptible to the effect of the surface tension, it is possible to form an insulating coating film that corresponds to the shape of an opening of a die and that has a highly uniform thickness.

BEST MODES FOR CARRYING OUT THE INVENTION

Figure 1:
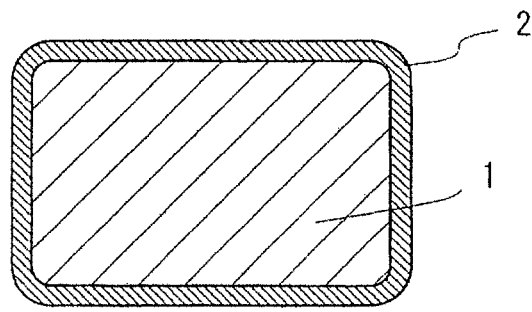
FIG. 1 is a cross-sectional view illustrating a structure of a flat insulated electrical wire.
Figure 2:
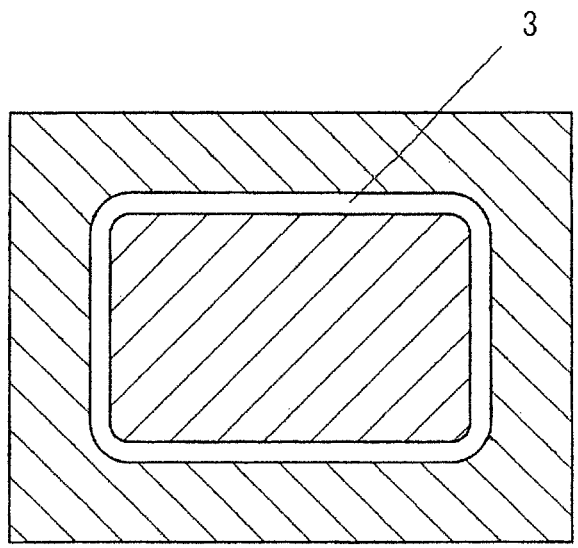
FIG. 2 is a cross-sectional view illustrating a structure of an existing die used in the production of a flat insulated electrical wire.
Figure 3:
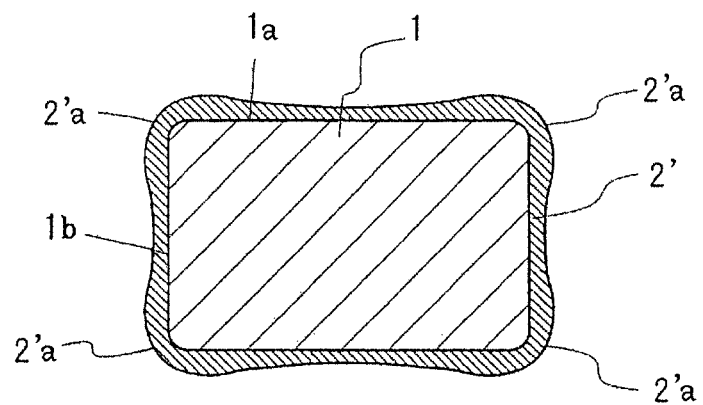
FIG. 3 is a schematic cross-sectional view of a structure for explaining a problem of a flat insulated electrical wire.

Embodiments of the present invention will be described below. It is to be understood that the embodiments disclosed herein are only illustrative and not restrictive in all aspects. It is intended that the scope of the present invention is defined by the claims and includes equivalents of the claims and all modifications within the scope of the claims.

An insulating varnish for an insulated electrical wire of the present invention is an insulating varnish that is applied onto a surface of a conductor, subsequently passes through a die to remove the excess applied insulating varnish, and is then dried or baked to form an insulating coating film on the surface of the conductor, the insulating varnish having a viscosity of 10 Pa·s or more at 30° C. The type of insulating varnish, namely, the type of resin constituting a component of the coating film, and the specific composition of the insulating varnish are not particularly limited. The term "viscosity" used herein refers to a viscosity measured with a B-type viscometer.

As such an insulating varnish that is applied onto a surface of a conductor, subsequently passes through a die to remove the excess applied insulating varnish, and is then dried or baked to form an insulating coating film on the surface of the conductor, hitherto, a varnish having a viscosity of about 0.5 to 5 Pa·s has been usually used. The reason for this is that a varnish having this degree of viscosity is good in terms of coating workability and that a resin solution having this degree of viscosity is easily synthesized from the standpoint of the production of a varnish. However, in the case where a high shear stress is applied when the varnish passes through a die (in particular, a die for a flat insulated electrical wire), it is difficult to maintain the shape formed at the time when the varnish passes through the die because, for example, the viscosity of the varnish decreases and the varnish flows. In this point, in a varnish having a high viscosity of 10 Pa·s or more, even in the case where a high shear stress is applied when the varnish passes through a die and the viscosity of the varnish decreases, a decrease in the viscosity which causes the flow of the varnish can be prevented. Accordingly, baking and solidification can be performed while maintaining the coating state where the varnish has a shape similar to the cross-sectional shape of the conductor, the cross-sectional shape being formed when the varnish passes through the die. Therefore, the variation in the film thickness, in particular, the level of the variation with respect to the film thickness can be suppressed, and thus it is possible to obtain an insulating coating film whose average film thickness is substantially uniform. Furthermore, in the case of a varnish having a high viscosity, a high internal pressure is applied to the conductor during the coating of the varnish, and thus the center of the conductor is less likely to deviate. Also from this standpoint, the uniformity of the thickness of an insulating coating film can be easily improved.

A high viscosity can also be achieved by increasing the content of a solid additive such as a filler. However, from the standpoint of physical properties of an insulating coating film, it is not preferable to increase the viscosity by increasing the content of a solid additive such as a filler because the relative ratio of a resin component decreases. It is desirable that the viscosity be increased by increasing the molecular weight of the resin component.

The type of resin of a coating film component, the types of additives, the dilution ratio, etc. are not particularly limited as long as the viscosity is 10 Pa·s or more. However, from the standpoint of physical properties of the resulting insulating coating film, the viscosity is preferably increased by increasing the content of the resin component, and furthermore, increasing the molecular weight of the resin component.

The resin (i.e., insulating coating film component) contained in the varnish may be either a drying-solidification type resin or a bake-curing type resin. Specific examples of the varnish include varnishes containing, as a main component, a resin that has been hitherto used in the field of the insulating varnish, such as a polyamide-imide resin, a polyimide resin, a polyester imide resin, a polyamide resin, a polyether sulfone resin, a polyether ether ketone resin, or a polysulfone resin. Among these varnishes, polyimide resin varnishes, which have good heat resistance, chemical resistance, and the like, will now be described as typical examples.

Polyimide resins are usually synthesized by subjecting a diamine and a tetracarboxylic dianhydride to a ring-opening polyaddition/dehydration cyclization reaction. A polyimide varnish is subjected to dehydration and ring-closure by heat curing, thereby forming a polyimide resin coating film. The varnish used for the application is a solution of a polyimide precursor called polyamic acid.

The polyimide precursor is usually synthesized by using a tetracarboxylic acid or an anhydride thereof as an acid component and a diamine compound as an amine component, and polycondensing these two compounds in a polar organic solvent at 0° C. to 100° C. under the anhydrous condition.

Examples of the tetracarboxylic acid and the anhydride thereof include aromatic tetracarboxylic dianhydrides such as pyromellitic dianhydride, 3,3',4,4'-benzophenonetetracarboxylic dianhydride, benzene-1,2,3,4-tetracarboxylic dianhydride, naphthalene-2,3,6,7-tetracarboxylic dianhydride, 3,3',4,4'-diphenyl tetracarboxylic dianhydride, 2,2''',3,3''-p-terphenyltetracarboxylic dianhydride, 2,2-bis(2,3-dicarboxyphenyl)-propane dianhydride, bis(2,3-dicarboxyphenyl) ether dianhydride, bis(2,3-dicarboxyphenyl)methane dianhydride, 3,3',4,4'-diphenylsulfonetetracarboxylic dianhydride, bis(2,3-dicarboxyphenyl)sulfone dianhydride, 1,1-bis(2,3-dicarboxyphenyl)ethane dianhydride, perylene-3,4,9,10-tetracarboxylic dianhydride, and phenanthrene-1,2,7,8-tetracarboxylic dianhydride; alicyclic acid anhydrides such as cyclopentane-1,2,3,4-tetracarboxylic dianhydride; and heterocyclic derivatives such as pyrazine-2,3,5,6-tetracarboxylic dianhydride. These acid components may be used alone or in combination of two or more components.

Examples of the diamine compound include aromatic diamines such as 2,2-di(p-aminophenyl)-6,6'-bisbenzoxazole, m-phenylenediamine, 4,4'-diaminodiphenylpropane, 2,2-bis[4-(4-aminophenoxy)phenyl]propane, 4,4'-diaminodiphenyl sulfone, 4,4'-diaminodiphenyl ether, benzidine, 4,4''-diamino-p-terphenyl, p-bis(2-methyl-4-aminopentyl) benzene, 1,5-diaminonaphthalene, 2,4-diaminotoluene, m-xylene-2,5-diamine, and m-xylylenediamine; and aliphatic diamines such as piperazine, methylenediamine, ethylenediamine, and tetramethylenediamine. These amine components may be used alone or in combination of two or more components.

Examples of the solvent include polar organic solvents such as N-methyl-2-pyrrolidone, N,N-dimethylacetamide, N,N-dimethylformamide, dimethyl sulfoxide, tetramethylurea, hexaethylphosphoric triamide, and γ-butyrolactone. Besides these polar organic solvents, examples of the solvent further include ketones such as acetone, methyl ethyl ketone, methyl isobutyl ketone, and cyclohexanone; esters such as methyl acetate, ethyl acetate, butyl acetate, and diethyl oxalate; ethers such as diethyl ether, ethylene glycol dimethyl ether, diethylene glycol monomethyl ether, diethylene glycol dimethyl ether, and tetrahydrofuran; halogenated hydrocarbons such as dichloromethane and chlorobenzene; hydrocarbons such as hexane, heptane, benzene, toluene, and xylene; phenols such as cresol and chlorophenol; and tertiary amines such as pyridine. These solvents may be used alone or in combination of two or more solvents. The amount of solvent used is an amount in which at least components such as a polyimide resin are sufficiently uniformly dissolved or dispersed.

The reaction between a tetracarboxylic dianhydride and a diamine compound is conducted in the above-mentioned solvent. Since the reactivity between the tetracarboxylic dianhydride and the diamine compound is high, the reaction between these two compounds rapidly proceeds as a result of mixing. Consequently, a high-viscosity solution is formed at an initial stage. Subsequently, when the heating temperature is increased, an imide ring closure reaction occurs and molecular chains are cut by water produced by the reaction. As a result, the viscosity decreases. Accordingly, in order to obtain a polyimide precursor solution having a high viscosity of 10 Pa·s or more, it is necessary to maintain a temperature at which imidization does not occur, and to terminate the reaction by immediately conducting cooling at the time when the reaction solution reaches a desired viscosity.

Specifically, the polyimide precursor is preferably synthesized by conducting a reaction by first dissolving a predetermined total amount of diamine compound in a solvent while maintaining a temperature of about 20° C. to 30° C., and then gradually adding a tetracarboxylic dianhydride to the solution.

A polyimide precursor solution obtained as described above usually contains a polyimide precursor having a high weight-average molecular weight of 30,000 to 90,000. An insulating varnish of the present invention obtained as described above is usually used as a varnish having a resin solid content of about 10% to 50%. In order to adjust the viscosity, the amount of dilution solvent may be adjusted or a resin solution that still contains a solvent used in the synthesis may be used. As in the case of a polyimide resin varnish, in the case where a resin synthesized in the presence of a solvent is used without further treatment, the solvent used in the synthesis usually functions as a solvent of the varnish.

The insulating varnish of the present invention may further contain various additives such as a pigment, a dye, an inorganic or organic filler, a lubricant, and an adhesion improver, as required. However, as described above, from the standpoint of physical properties of the resulting insulating coating film, preferably, these additives are not added. In particular, the high viscosity, which is a requirement of the present invention, is preferably achieved by realizing a high-molecular weight of an insulating coating film resin.

A description has been made using a polyimide resin as a typical example, but the insulating varnish of the present invention is not limited to a polyimide resin varnish. The insulating varnish of the present invention may be an insulating varnish obtained by using another resin for forming a coating film as long as the viscosity is 10 Pa·s or more, the insulating varnish being preferably in the form of a resin solution containing no additive such as a filler as long as the viscosity is 10 Pa·s or more.

The insulated electrical wire of the present invention includes an insulating coating formed by using the insulating varnish of the present invention.

A metal wire such as a copper wire, an aluminum wire, an aluminum alloy wire, a nickel-plated copper wire, or a silver-plated copper wire is used as a core wire functioning as a conductor. The shape of the core wire is not particularly limited. However, the insulated electrical wire of the present invention is particularly useful for a conductor on which an insulating varnish easily flows after the conductor passes through a die and a coating film having a uniform thickness is not easily formed, for example, a flat conductor having a rectangular cross section.

By immersing a conductor in a coating bath containing an insulating varnish of the present invention therein, the insulating varnish is applied onto a surface of the conductor. The conductor is then allowed to pass through a die to remove the insulating varnish that has been excessively applied and to smooth the coated surface. Subsequently, a baking process is performed. The application, passing through the die, and the baking process may be repeatedly performed twice or more. A series of these processes may be performed by using vertical-type equipment in which a coating bath, a die, and a baking furnace are arranged from the bottom in that order or by using a horizontal-type equipment in which a coating bath, a die, and a baking furnace are arranged in parallel.

The insulating varnish of the present invention has a high viscosity. Therefore, even in the case where the viscosity decreases when the insulating varnish passes through a die, the varnish can maintain a viscosity with which the varnish does not flow. Accordingly, a coating film having a shape similar to the shape of the die can be maintained, and an insulating coating film having a high thickness uniformity can be formed by heat curing.

The baking temperature and the baking time of the insulating varnish are appropriately selected in accordance with the type of resin that forms a coating film, the resin being a main component. For example, in the case of a polyimide varnish, baking is preferably performed by allowing the varnish to pass through a furnace at about 350° C. to 500° C. for 5 to 10 seconds per pass.

The thickness of the insulating coating film is preferably 1 to 100 μm, and more preferably 10 to 50 μm from the standpoint of protecting a conductor. An insulating coating film having a large thickness can be formed by repeatedly performing application and baking. Even in the case where the coating film has a large thickness, the uniformity of the coating film can be ensured.

Specifically, in the case of a flat conductor having a rectangular cross section, it is possible to obtain an insulated electrical wire in which, in 1,500 cm of the insulating coating film in the longitudinal direction of the electrical wire, a variation ratio of the film thickness represented by a formula below is 20% or less. In the formula below, σ represents the standard deviation.

Variation ratio (%)=(4σ/average film thickness)×100

An insulating coating film formed by using the insulating varnish of the present invention may be formed directly on a conductor. Alternatively, first, an underlying layer may be formed on a surface of a conductor, and an insulating coating film composed of a polyimide resin or the like may be formed on the underlying layer.

Examples of the underlying layer include insulating films formed by applying a publicly known insulating varnish and baking the insulating varnish, the insulating varnish being composed of polyurethane, polyester, polyester imide, polyester amide-imide, polyamide-imide, polyimide, or the like.

Furthermore, an overcoat layer may be provided on an insulating coating film formed by using the insulating varnish of the present invention. In particular, a surface lubricating layer for providing lubricity is preferably provided on the outer surface of an insulated electrical wire because it is possible to reduce a stress generated by friction between the electrical wires during coiling or by a compression process for increasing the space factor, and furthermore, damage of the insulating coating film caused by this stress. A resin constituting the overcoat layer is not particularly limited as long as the resin has lubricity. Examples thereof include products obtained by binding a lubricant such as a paraffin, e.g., a liquid paraffin or a solid paraffin, a wax, polyethylene, a fluororesin, or a silicone resin with a binder resin. Preferably, an amide-imide resin to which lubricity is provided by adding a paraffin or a wax is used.

EXAMPLES

Best modes for carrying out the present invention will now be described by way of Examples. The Examples do not limit the scope of the present invention.
[Measurement and Evaluation Methods]
First, evaluation methods used in the Examples will be described.

Figure 4:
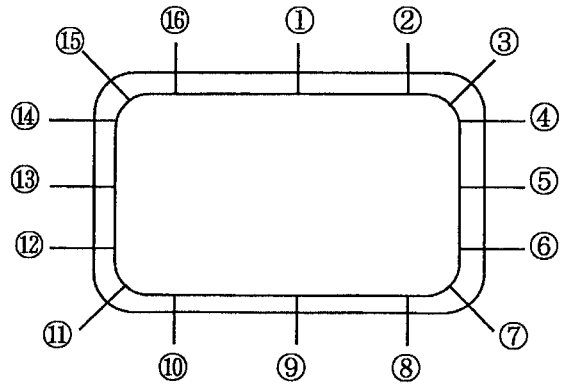
FIG. 4 is a view for explaining a measurement method in Examples.

(1) Viscosity (Pa·s)
The viscosity was measured at 30° C. using a B-type viscometer (RB80L manufactured by Toki Sangyo Co., Ltd., rotor No. M4, the number of revolutions: 6 rpm).
(2) Average film thickness (μm) and deviation (4σ)
With respect to a cross section of a prepared insulated electrical wire, film thicknesses at 16 points shown by the circled numbers in FIG. 4 are measured. The film thicknesses were measured at intervals of 50 cm for cross sections of N=30. An average of the measured film thicknesses at 16 points×30=480 points was determined. A deviation (4σ) (where σ is the standard deviation) of the measured values was also determined. This deviation means that even when the average film thicknesses are substantially the same, an insulated electrical wire having a large deviation (4σ) has a large variation in the film thickness.
(3) Variation Ratio (%)
A variation ratio with respect to the average film thickness was determined by a formula below using the average film thickness and the deviation obtained in (2) above.

Variation ratio=(4σ/average film thickness)×100%

An insulated electrical wire having a variation ratio of 20% or more has a low uniformity of the film thickness, and a so-called dog-bone-shaped coating film tends to be formed.
[Preparation of Polyimide Resin Varnish Nos. 1 to 6 and Production and Evaluation of Insulated Electrical Wires]

In 773.6 g of N-methylpyrrolidone (NMP) dehydrated with a molecular sieve, 70.1 g of 2,2'-bis[4-(4-aminophenoxy)phenyl]propane (BAPP) and 57.0 g of 4,4'-diaminodiphenyl ether (ODA) were dissolved (at 30° C.). After these compounds were completely dissolved, 99.3 g of pyromellitic anhydride (PMDA) was gradually added thereto while the temperature was maintained so as not to exceed 80° C. At the time when the viscosity reached a desired value, the reaction mixture was cooled. Thus, a polyimide precursor solution having a predetermined viscosity was prepared. The prepared polyimide precursor solution corresponds to 21% of a polyimide resin (non-volatile content).

Polyimide precursor solution Nos. 1 to 6 having different viscosities were used as insulating varnish Nos. 1 to 6. Flat conductors each having a cross-sectional shape of 1.7 mm×3.4 mm were immersed in the insulating varnish Nos. 1 to 6 using vertical-type coating equipment. Each of the flat conductors was allowed to pass through a die having an opening having a shape similar to the shape of the conductor at a rate of 3.5 m/min, and to pass through a baking furnace, thus conducting baking at 350° C. for one minute. Thus, an insulating coating film was formed. The application of the insulating varnish, the passing through the die, and the baking were repeatedly performed 8 times, thus preparing an insulated electrical wire including a polyimide resin coating film as an insulating coating film. For the prepared insulated electrical wire, the average film thickness and the deviation were determined on the basis of the evaluation methods described above. Furthermore, the variation ratio with respect to the film thickness was calculated.

Figure 5:
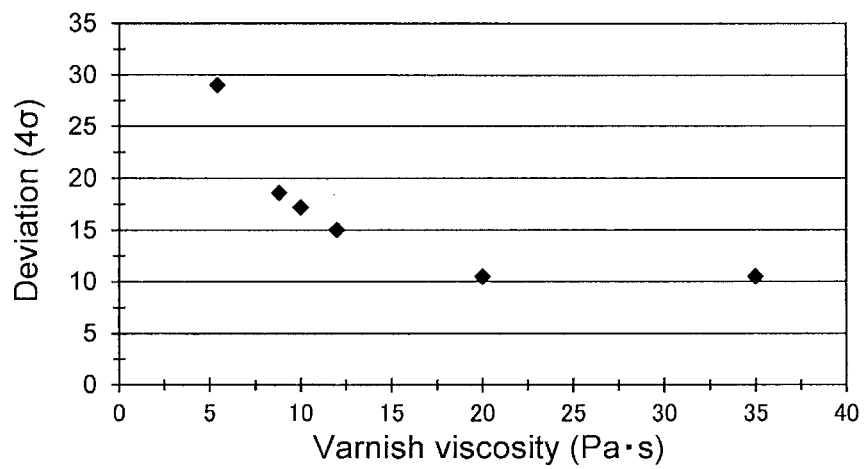
FIG. 5 is a graph showing a relationship between a varnish viscosity and the deviation (4σ) of a film thickness.
Figure 6:
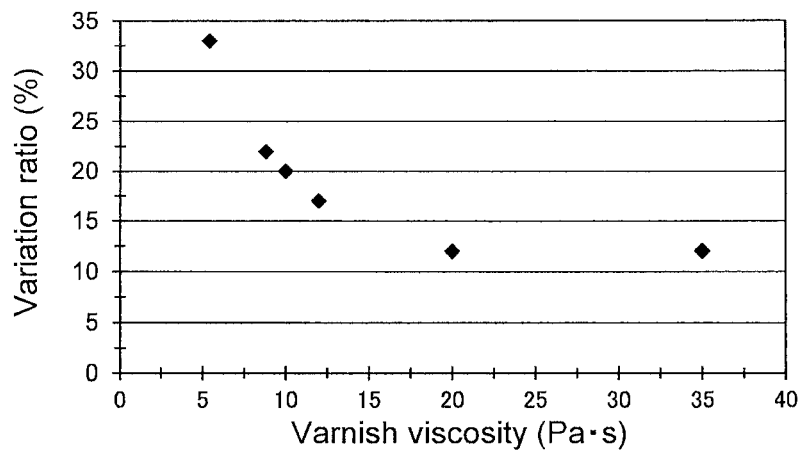
FIG. 6 is a graph showing a relationship between a varnish viscosity and a variation ratio of a film thickness.

Table I shows the viscosity of each of the insulating varnishes, the average film thickness of each of the resulting insulating coating films, the deviation (4σ), and the variation ratio. FIG. 5 shows a relationship between the varnish viscosity and the deviation. FIG. 6 shows a relationship between the varnish viscosity and the variation ratio. Note that varnish Nos. 1 and 2 correspond to varnishes having substantially the same viscosities as those of existing polyimide resin varnishes.

TABLE I

| | Varnish No. | | | | | |
|---|---|---|---|---|---|---|
| | 1 | 2 | 3 | 4 | 5 | 6 |
| Varnish viscosity (Pa·s) | 5.4 | 8.8 | 10.0 | 12.0 | 20.0 | 35.0 |
| Average film thickness (μm) | 87.8 | 86.2 | 87.2 | 87.5 | 88.1 | 88.5 |
| Deviation (4σ) | 29.0 | 18.6 | 17.2 | 15.0 | 10.5 | 10.5 |
| Variation ratio (%) | 33 | 22 | 20 | 17 | 12 | 12 |

As is apparent from FIG. 5, with the increase in the varnish viscosity, the deviation of the thickness of the insulating coating film decreases, and the deviation of the coating film becomes substantially constant at a viscosity of 10 Pa·s or more. Similarly, as is apparent from FIG. 6, with the increase in the varnish viscosity, the variation ratio of the thickness of the insulating coating film also decreases, and the effect of reducing the variation ratio is substantially saturated at a viscosity of 10 Pa·s or more.

Accordingly, an insulating coating film having a high thickness uniformity can be realized by using the insulating varnish of the present invention, which has a varnish viscosity of 10 Pa·s or more. In other words, a so-called dog bone shape of the insulating coating film, which is considered to be a problem in a flat electrical wire, can be prevented.

INDUSTRIAL APPLICABILITY

Since the insulating varnish of the present invention has a high viscosity, even when a high shear stress is applied, for example, when the varnish is passed through a die, the varnish does not flow, and baking and solidification can be performed while maintaining a coating film having a shape formed after the varnish passes through the die. Accordingly, the insulating varnish of the present invention is useful for forming an insulating coating film of a flat electrical wire, for which it is generally believed to be difficult to adjust the film thickness to be uniform by adjusting the amount of applied varnish by allowing the varnish to pass through a die.

REFERENCE SIGNS LIST 1 conductor (core wire)
2, 2' insulating coating film
3 opening

The invention claimed is:

1. A method for making an insulated electrical wire, comprising:
   providing a conductor with an outer surface;
   applying an insulating varnish to the outer surface of the conductor thereby producing a coated conductor, the insulating varnish having a viscosity of greater than 12 Pa·s at 30° C., the applying of the insulating varnish to the conductor includes the insulating varnish having no filler;
   passing the coated conductor through a die to remove the excess insulating varnish; and
   drying or baking the coated conductor to form an insulating coating film on the surface of the conductor.

2. The method for making an insulated electrical wire according to claim 1, wherein
   the applying of the insulating varnish to the conductor includes the insulating varnish including a polyimide precursor solution.

3. The method for making an insulated electrical wire according to claim 2, wherein
   the applying of the insulating varnish includes the polyimide precursor solution of the insulating varnish containing a polyimide precursor having a high weight-average molecular weight of between 30,000 to 90,000.

4. The method for making an insulated electrical wire according to claim 1, wherein
   the drying or baking of the coated conductor includes baking the insulating varnish.

5. The method for making an insulated electrical wire according to claim 1, wherein
   the providing of the conductor with an outer surface includes the outer surface of the conductor having a rectangular cross section.

6. The method for making an insulated electrical wire according to claim 1, wherein
   the applying of the insulating varnish includes the insulating varnish having a resin solid content of between 10% to 50%.

7. An insulating varnish for application to a surface of a conductor, the insulating varnish comprising:
   a polyimide precursor solution having a viscosity of greater than 12 Pa·s at 30° C., the insulating varnish having no filler.

8. The insulating varnish according to claim 7, wherein
   the polyimide precursor solution contains a polyimide precursor having a high weight-average molecular weight of between 30,000 to 90,000.

9. The insulating varnish according to claim 7, wherein
   the polyimide precursor solution has a resin solid content of between 10% to 50%.

* * * * *